United States Patent
Suyama et al.

(10) Patent No.: US 10,860,131 B2
(45) Date of Patent: Dec. 8, 2020

(54) TOUCH PANEL CONTROL DEVICE AND INFORMATION PROCESSING APPARATUS

(71) Applicant: SHARP KABUSHIKI KAISHA, Sakai (JP)

(72) Inventors: Tatsuhiko Suyama, Sakai (JP); Noriyuki Tanaka, Sakai (JP); Takuya Sone, Sakai (JP); Daiji Kitagawa, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 34 days.

(21) Appl. No.: 16/081,013

(22) PCT Filed: Feb. 27, 2017

(86) PCT No.: PCT/JP2017/007288
§ 371 (c)(1),
(2) Date: Aug. 29, 2018

(87) PCT Pub. No.: WO2017/150399
PCT Pub. Date: Sep. 8, 2017

(65) Prior Publication Data
US 2019/0025978 A1  Jan. 24, 2019

(30) Foreign Application Priority Data
Mar. 4, 2016 (JP) .................. 2016-042840

(51) Int. Cl.
*G06F 3/041* (2006.01)
*G02F 1/133* (2006.01)
*G02F 1/1333* (2006.01)

(52) U.S. Cl.
CPC ........ *G06F 3/0416* (2013.01); *G02F 1/13306* (2013.01); *G02F 1/13338* (2013.01); *G06F 3/0412* (2013.01)

(58) Field of Classification Search
CPC combination set(s) only.
See application file for complete search history.

(56) References Cited

U.S. PATENT DOCUMENTS

2011/0267293 A1* 11/2011 Noguchi ............... G06F 3/0416
345/173
2014/0191989 A1*  7/2014 Saitoh .................. G09G 3/3614
345/173

(Continued)

FOREIGN PATENT DOCUMENTS

JP      2015-141538 A    8/2015
WO   WO-2015115442 A1 *  8/2015 ........... G06F 3/0416

*Primary Examiner* — Temesghen Ghebretinsae
*Assistant Examiner* — Sosina Abebe
(74) *Attorney, Agent, or Firm* — ScienBiziP, P.C.

(57) ABSTRACT

The power consumption of an apparatus including a touch panel is reduced. In a touch panel control device (1) including a sensor drive section (22) and a liquid crystal drive controller (10), the sensor drive section (22) makes a detection sensitivity during a pause period lower than a detection sensitivity during an update period, the pause period being a period in which the liquid crystal drive controller (10) does not update the image that is displayed on a liquid crystal display panel (40), the update period being a period in which the liquid crystal drive controller (10) updates the image that is displayed on the liquid crystal display panel (40).

5 Claims, 5 Drawing Sheets (56) References Cited

U.S. PATENT DOCUMENTS

2014/0204045 A1* 7/2014 Komoto ............... G06F 3/0416
                                                    345/173
2017/0090624 A1* 3/2017 Kwon .................. G06F 3/0416

* cited by examiner

TOUCH PANEL CONTROL DEVICE AND INFORMATION PROCESSING APPARATUS

TECHNICAL FIELD

The present invention relates to a touch panel control device and an information processing apparatus.

BACKGROUND ART

In relation to a touch panel including a display, such as a liquid crystal display panel, and a touch sensor, a technology with which to detect a touch of a pointer such as a finger according to a method of driving the display has recently been under development. Such a touch panel operates under control of various types of signal that are sent out from a touch panel control device.

Figure 5:
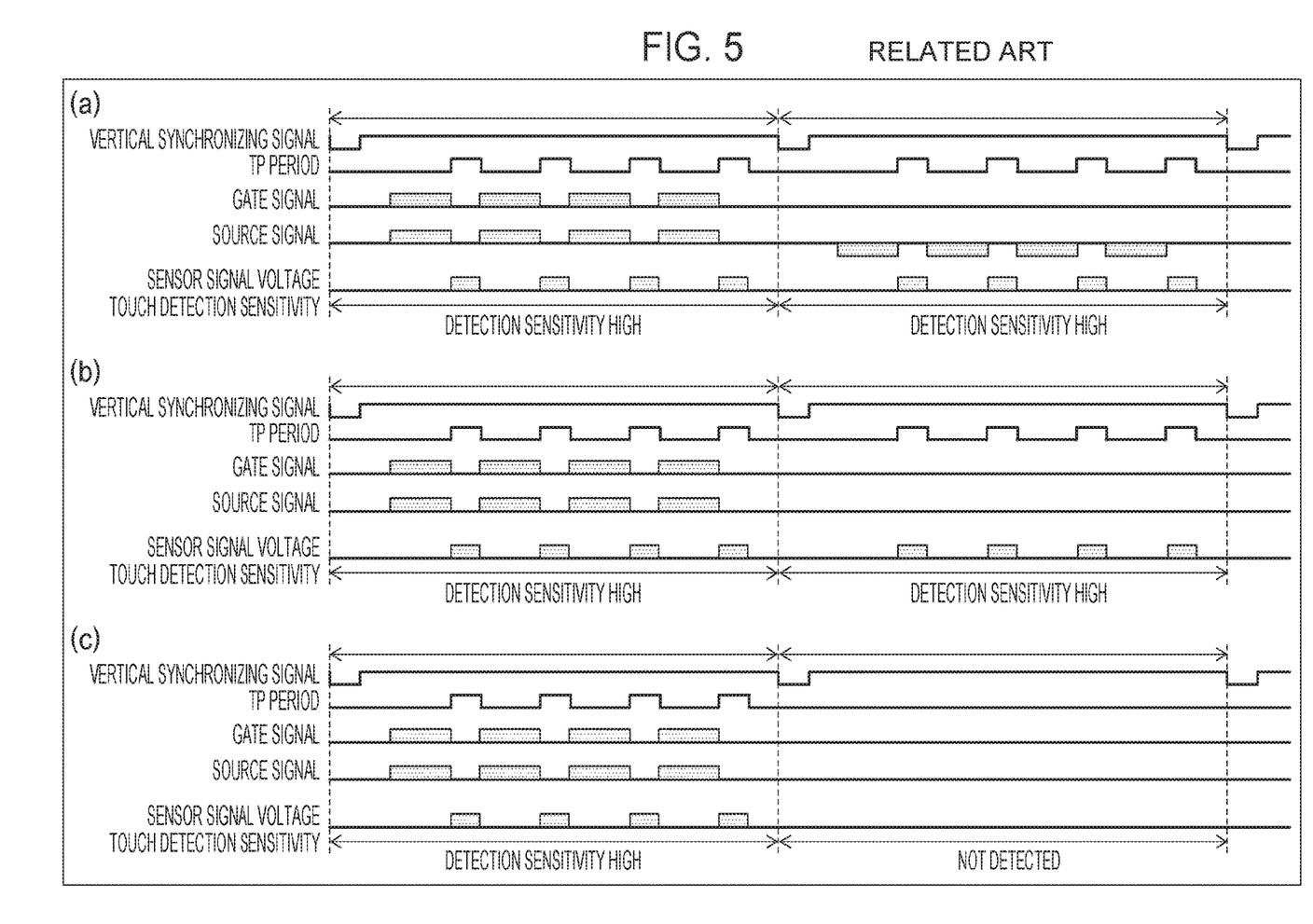
FIG. 5 illustrates timing charts showing signals and the like that are sent out from a touch panel control device of a conventional technology to a touch panel.

(a) to (c) of FIG. 5 show timing charts each showing a vertical synchronizing signal of the liquid crystal display panel of the touch panel, a period (TP period) during which the touch sensor of the touch panel can detect a touch, gate and source signals by which the liquid crystal display panel is driven, a sensor signal voltage that is outputted from the touch panel control device in order for the touch sensor to detect a touch, and the detection sensitivity of the touch sensor.

In the following, each signal is referred to as being high when it is hi h in voltage, and low when low in voltage. In the example shown in FIG. 5, the touch panel control device exercises control so that a display of one frame of image on the liquid crystal display panel is triggered by the vertical synchronizing signal becoming low.

For convenience, each of (a) to (c) of FIG. 5 is illustrated such that the gate signal becomes high four times in one vertical period (i.e. one frame period). In actuality, however, the number of times that the gate signal becomes high in one vertical period corresponds to the number of scanning signal lines.

Each of (a) to (c) of FIG. 5 shows a case where the first frame is an update period during which a gate signal by which a display update of one screen of the liquid crystal display panel is made is being applied and the second frame that follows the first frame is a pause period during which the gate signal is not applied and the driving of the liquid crystal display panel is in pause (that is, the display update is in pause).

(a) of FIG. 5 shows a case where control is exercised in the pause period so that the gate signal is not applied and the source signal and the sensor voltage signal are applied in a manner similar to that in which they are in the update period.

A touch on the touch panel can be detected during high portions of time of a period represented by the TP period in FIG. 5, and in the case shown in (a) of FIG. 5, the pause period too includes portions of time which are similar to those of the update period and during which a touch on the touch panel can be detected. Moreover, as shown in (a) of FIG. 5, the touch panel control device equally applies the sensor signal voltage to the touch panel in both the update period and the pause period. This enables the touch sensor to, even in the pause period, detect a touch with a detection sensitivity which is similar to that with which it detects a touch in the update period.

Note here that continuing to drive a liquid crystal with a DC voltage and apply the DC voltage to the liquid crystal leads to deterioration in liquid crystal material. In the case shown in (a) of FIG. 5, this problem is addressed by the touch panel control device controlling the application of the source signal so that the source signal reverse its phase every frame.

(b) of FIG. 5 shows a case where control is exercised in the pause period so that the gate signal and the source signal are not applied and the sensor voltage signal is applied in a manner similar to that in which it is in the update period. In the case shown in (b) of FIG. 5, too, the pause period includes portions of time which are similar to those of the update period and during which a touch on the touch panel can be detected. Further, in the case shown in (a) of FIG. 5, too, the touch panel control device equally apples the sensor signal voltage to the touch panel in both the update period and the pause period. This enables the touch sensor to, even in the pause period, detect a touch with a detection sensitivity which is similar to that with which it does in the update period.

(c) of FIG. 5 shows a case where control is exercised in the pause period so that the gate signal, the source signal, and the sensor signal voltage are not applied. In the case shown in (c) of FIG. 5, the pause period does not include portions of time which are similar to those of the update period and during which a touch on the touch panel can be detected. This makes the touch sensor unable to detect a touch during toe pause period.

Furthermore, PTL 1 discloses a technology with which to perform a detection operation with a first detection sensitivity during an update period in which display control means performs a display update and perform a detection operation with a second detection sensitivity that is higher than the first detection sensitivity during a pause period in which the display control means pauses the display update. This allegedly makes it possible to reduce the effect of liquid crystal noise caused by the display driving of the liquid crystal display panel on a result of detection yielded by the touch sensor. Further, during the pause period, in which liquid crystal noise is not caused by the display driving of the liquid crystal display panel, performing a detection operation with a high detection operation allegedly has no adverse effect on a result of detection yielded by the touch sensor.

CITATION LIST

Patent Literature

PTL 1: Japanese Unexamined Patent Application Publication No. 2015-141538 (Published on Aug. 3, 2015)

SUMMARY OF INVENTION

Technical Problem

In a case such as those shown in (a) and (b) of FIG. 5 where even in the pause period, the touch panel control device outputs the sensor sig al voltage in a manner similar to that in which it does in the update period and even during the pause period, the touch sensor can detect a touch in a manner similar to that in which it does in the update period, the device consumes a larger amount of electricity.

Meanwhile, in a case such as that shown in (c) of FIG. 5 where the touch panel control device does not output the sensor signal voltage during the pause period and the touch sensor cannot detect a touch at all during the pause period, a user suffers from hampered convenience.

Further, in the technology disclosed in PTL 1, the detection sensitivity of the touch sensor during the pause period of the liquid crystal display panel is higher than the detection sensitivity of the touch sensor during the update period of the liquid crystal display panel. This causes a higher voltage to be applied to the touch panel in the pause period than in the update period, causing the device to consume a larger amount of electricity.

An aspect of the present invention is one made in view of the foregoing problems and has as an object to provide a technology with which to reduce the power consumption of an apparatus including a touch panel.

Solution to Problem

In order to solve the foregoing problems, a touch panel control device according to an aspect of the present invention includes: a touch sensitivity changing section that changes a detection sensitivity with which a touch sensor detects a touch; and a display control section that controls an image that is displayed on a display section. The touch sensitivity changing section makes a detection sensitivity during a pause period lower than a detection sensitivity during an update period, the pause period being a period in which the display control section does not update the image that is displayed on the display section, the update period being a period in which the display control section updates the image that is displayed on the display section.

Further, an information processing apparatus according to an aspect of the present invention includes: a touch panel control device, a touch sensor, a display section, and a host that transmits, to the touch panel control device, an image to be displayed on the display section.

Advantageous Effects of Invention

An aspect of the present invention brings about an effect of making it possible to reduce the power consumption of an apparatus.

DESCRIPTION OF EMBODIMENTS

Embodiment 1

Figure 1:
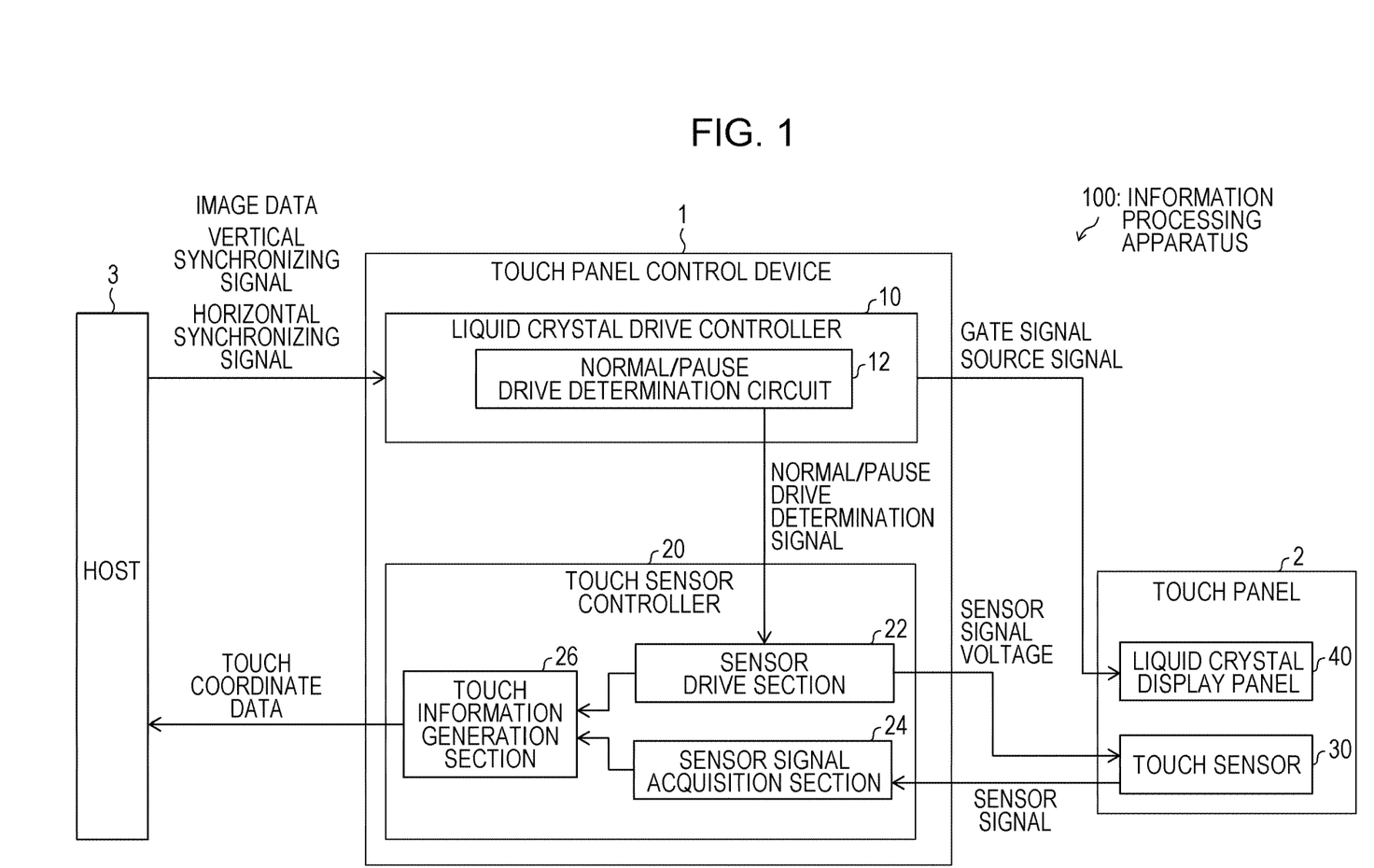
FIG. 1 is a block diagram showing a configuration of the main components of an information processing apparatus according to an embodiment of the present invention.

An embodiment of the present invention is described below. In the following embodiment, an information processing apparatus 100 mounted with a touch panel control device 1 is described. FIG. 1 is a block diagram showing a configuration of the main components of the information processing apparatus 100. An example of the information processing apparatus 100 is a smartphone, a tablet terminal, or the like. As illustrated, the information processing apparatus 100 includes the touch panel control device 1, a touch panel 2, and a host 3.

<Configuration of Main Components of Information Processing Apparatus>

The touch panel control device 1 receives image data, a vertical synchronizing signal, and a horizontal synchronizing signal that are outputted from the host 3.

The touch panel 2 is a touch panel formed by a combination of an input device and a display device. The touch panel 2 receives a sensor voltage signal that is outputted from the touch panel control device 1 for touch detection. Further, the touch panel 2 transmits, to the touch panel control device 1, a sensor signal representing detection of a touch of a pointer on a detection surface and a position where the touch has been detected.

Further, the touch panel 2 displays an image corresponding to image data on its display screen (i.e. a display surface of the after-mentioned liquid crystal display panel 40) in accordance with a gate signal and a source signal that are outputted from the touch panel control device 1. In the following, the term "display control" means that the touch panel control device 1 causes the touch panel 2 to display an image in accordance with the gate signal and the source signal. The term "gate signal" here means a signal that is outputted in synchronization with a timing of input of a horizontal synchronizing signal inputted to the touch panel control device 1. Further, the term "source signal" here means a signal representing information of one line of image that the touch panel 2 displays.

The touch panel control device 1 serves to control the touch panel 2. The touch panel control device 1 detects, with reference to a sensor signal voltage that the touch panel control device 1 has outputted to the touch panel 2 and a sensor signal inputted from the touch panel, detection of a touch of a pointer on a detection surface of the touch panel 2 and a position where the touch has been detected, and transmits, to the host 3, touch coordinate data representing a result of detection. The touch panel control device 1 also causes the display screen of the touch panel 2 to display an image corresponding to image data that the touch panel control device 1 has received from the host 3.

The host 3 serves to execute various types of function and application that the information processing apparatus 100 includes. The host 3 receives the touch coordinate data from the touch panel control device 1 and, in the function or application being executed, executes various types of arithmetic processing corresponding to the position.

Further, by executing various types of function and application, the host 3 generates image data to be displayed on the display screen (i.e. the display surface of the after-mentioned liquid crystal display panel 40) of the touch panel 2, and by providing the image data to the touch panel control device 1, the host 3 causes the display screen to be updated. The host 3 may provide image data representing an image per se to be displayed on the display screen of the touch panel 2 or may provide image data representing a difference between an image being displayed on the display screen of the touch panel 2 and an image to be displayed on the display screen of the touch panel 2 (i.e. image data containing information indicating whether to update the image). Furthermore, in the latter case, the host 3 may be configured not to provide image data to a case where there is no difference between the image being displayed on the display screen of the touch panel and the image to be displayed on the display screen of the touch panel 2 (i.e. a case where the image to be displayed does not change from the image being displayed), and the present embodiment describes a case where the host 3 includes such a configuration.

For example, the host 3 receives, from the touch panel control device 1, touch coordinate data representing the coordinates (touch coordinates) of the position of a touch of a pointer on the detection surface of the touch panel 2 (i.e. the after-mentioned touch sensor 30). Then, in the function or the like being executed, the host 3 performs a process corresponding to the touch coordinate date thus received. Then, the host 3 generates image data as triggered by the reception of the touch coordinate data, i.e. a user's operation, and transmits the image data to the touch panel control device 1. The touch panel control device 1 outputs this image data and gate and source signals corresponding to a horizontal synchronizing signal to the touch panel 2, whereby an update (display update) of the display screen (liquid crystal display panel 40) of the touch panel 2 is performed.

<Configuration of Main Components of Touch Panel>

Next, a configuration of the main components of the touch panel 2 is described. As shown in FIG. 1, the touch panel 2 includes the touch sensor 30 and the liquid crystal display panel 40 (display section). The touch sensor 30 serves to send out an input signal corresponding to a position on the detection surface of the touch panel 2 which corresponds to a pointer. More specifically, the touch sensor 30 is a sensor that detects a touch of a pointer such as a finger or a stylus pen as an electric signal. Application of a sensor signal voltage to the touch sensor 30 by the after-mentioned sensor drive section (touch sensitivity changing section) 22 causes a sensor signal to be outputted from the touch sensor 30. Note here that the sensor signal voltage is a signal that is outputted from the sensor drive section 22 in order for the touch sensor 30 to detect a touch. Further, a period during which the sensor signal voltage is applied to the touch sensor is hereinafter referred to as "detection period".

The liquid crystal display panel 40 is driven by a liquid crystal drive controller 10 for display control (i.e. to have its display screen updated). The liquid crystal display panel 40 may be formed integrally with the touch sensor 30, and is not limited to any particular type.

<Configuration of Main Components of Touch Panel Control Device>

Next, a configuration of the main component of the touch panel control device 1 is described. As shown in FIG. 1, the touch panel control device 1 includes the liquid crystal drive controller 10 (display control section) and a touch sensor controller 20.

The liquid crystal drive controller 10 controls the driving of the liquid crystal display panel 40. Further, the liquid crystal drive controller 10 receives image data, a vertical synchronizing signal, and a horizontal synchronizing signal from the host 3, generates a gate signal and a source signal in accordance with the image data, the vertical synchronizing signal and the horizontal synchronizing signal, and outputs the gate signal and the source signal to the liquid crystal display panel 40. The "horizontal synchronizing signal" is a signal that triggers the start of a display update of one line of the liquid crystal display panel 40. Further, the gate signal is a signal that is synchronized with the horizontal synchronizing signal, and the touch panel control device 1 outputs the gate signal in synchronization with the inputting of the horizontal synchronizing signal.

Further, the liquid crystal drive controller 10 includes a normal/pause drive determination circuit 12. The normal/pause drive determination circuit 12 determines, in accordance with the image data, the vertical synchronizing signal, and the horizontal synchronizing signal that the liquid crystal drive controller 10 received from the host 3, whether a drive period is an update period or a pause period, and generates a normal/pause drive determination signal indicating whether the drive period is an update period or a pause period.

The present embodiment assumes that the vertical synchronizing signal and the horizontal synchronizing signal have constant frequencies. In a case where the image data is present in a period delimited by the vertical synchronizing signal, i.e. one frame period, the normal/pause drive determination circuit 12 determines that the drive period is an "update period". The "update period" here is a period that includes a period in which the gate signal becomes high. In the update period, the liquid crystal drive controller 10 updates at least a part of the display screen of the liquid crystal di play panel 40.

Meanwhile, in a case where the image data is not present in a period delimited by the vertical synchronizing signal, i.e. one frame period, the normal/pause drive determination circuit 12 determines that the drive period is a "pause period". The "pause period" is a period during which the driving of the liquid crystal display panel 40 is in pause. During the pause period, the liquid crystal drive controller 10 does not drive the liquid crystal display panel 40 (i.e. pauses display the display update).

It should be noted that in a case where the image data is present in a period delimited by the horizontal synchronizing signal, the normal/pause drive determination circuit 12 may also determine that the drove period is an "update period". In this case, the "update period" is a period in which the gate signal becomes high. In the update period, the liquid crystal drive controller 10 updates a corresponding part of the display screen of the liquid crystal display panel 40. That is, there may also be a form in which an update period and a pause period are present in one frame period delimited by the vertical synchronizing signal.

Moreover, in the update period, the liquid crystal drive controller 10 transmits the gate signal and the source signal to the liquid crystal display panel 40. With this, an update of the display screen of the liquid crystal display panel 40 (i.e. display control) is executed at timings indicated by these signals.

Further, the normal/pause drive determination circuit 12 of the liquid crystal drive controller 10 transmits the normal/pause drive determination signal thus generated to the sensor drive section 22 of the touch sensor controller 20. According to a case where the normal/pause drive determination signal indicates an "update period or a case where the normal/pause drive determination signal indicates a "pause period", the sensor drive section 22 applies, to the touch sensor 30, the sensor signal voltage whose timing of output has been changed.

While the liquid crystal drive controller 10 needs only transmit at least the aforementioned signals to the touch sensor controller 20 and the liquid crystal display panel 40, the liquid crystal drive controller 10 may for example also transmit the vertical synchronizing signal to the touch sensor controller 20.

The touch sensor controller 20 serves to control the driving of the touch sensor 30 and calculate, from a sensor signal obtained by the driving of the touch sensor 30, a touch position of a pointer on the detection surface of the touch sensor 30. The touch position of the pointer thus calculated is transmitted as touch coordinate data to the host 3. More specifically, the touch sensor controller 20 includes the sensor drive section 22, a sensor signal acquisition section 24, and a touch information generation section 26. The sensor signal acquisition section 24 serves to acquire a sensor signal from the touch sensor and transmit it to the touch information generation section 26. The touch information generation section 26 serves to compare the sensor signal with a sensor signal voltage notified from the sensor drive section 22 and thereby detect a touch of a pointer on the detection surface of the touch sensor 30.

In a case where a pointer is touching the detection surface of the touch sensor 30, there is for example a change in electrostatic capacitance on the detection surface of the touch sensor 30. Accordingly, a voltage of the sensor signal that is generated in a case where a pointer has touched the detection surface of the touch sensor 30 is different from the sensor signal voltage.

Specifically, the sensor drive section 22 applies a sensor signal voltage of a certain amplitude to the touch sensor 30, and the sensor signal acquisition section 24 receives a sensor signal corresponding to the sensor signal voltage. Moreover, if a voltage of the sensor signal thus received is found by comparison to be equal to the sensor signal voltage Thus outputted, the touch information generation section 26 determines that there is no touch of a pointer on the detection surface of the touch sensor 30. On the other hand, if the voltage of the sensor signal thus received is found by comparison to be different from the sensor signal voltage thus outputted, the touch information generation section 26 determines that there is a touch of a pointer on the detection surface of the touch sensor 30.

The term "detection sensitivity" refers to such a size of a touch area by which a pointer touches the detection surface of the touch sensor 30 that the touch information generation section 26 becomes able to detect the coordinates (position) of the pointer. Specifically, the touch information generation section 26 can detect the coordinates (position) of a pointer even if the pointer is a pen or the like having a small touch area by which it touches the detection surface of the touch sensor 30. The detection sensitivity can be raised by increasing the amount of sensor signal voltage that is applied.

<Example of Operation>

Figure 2:
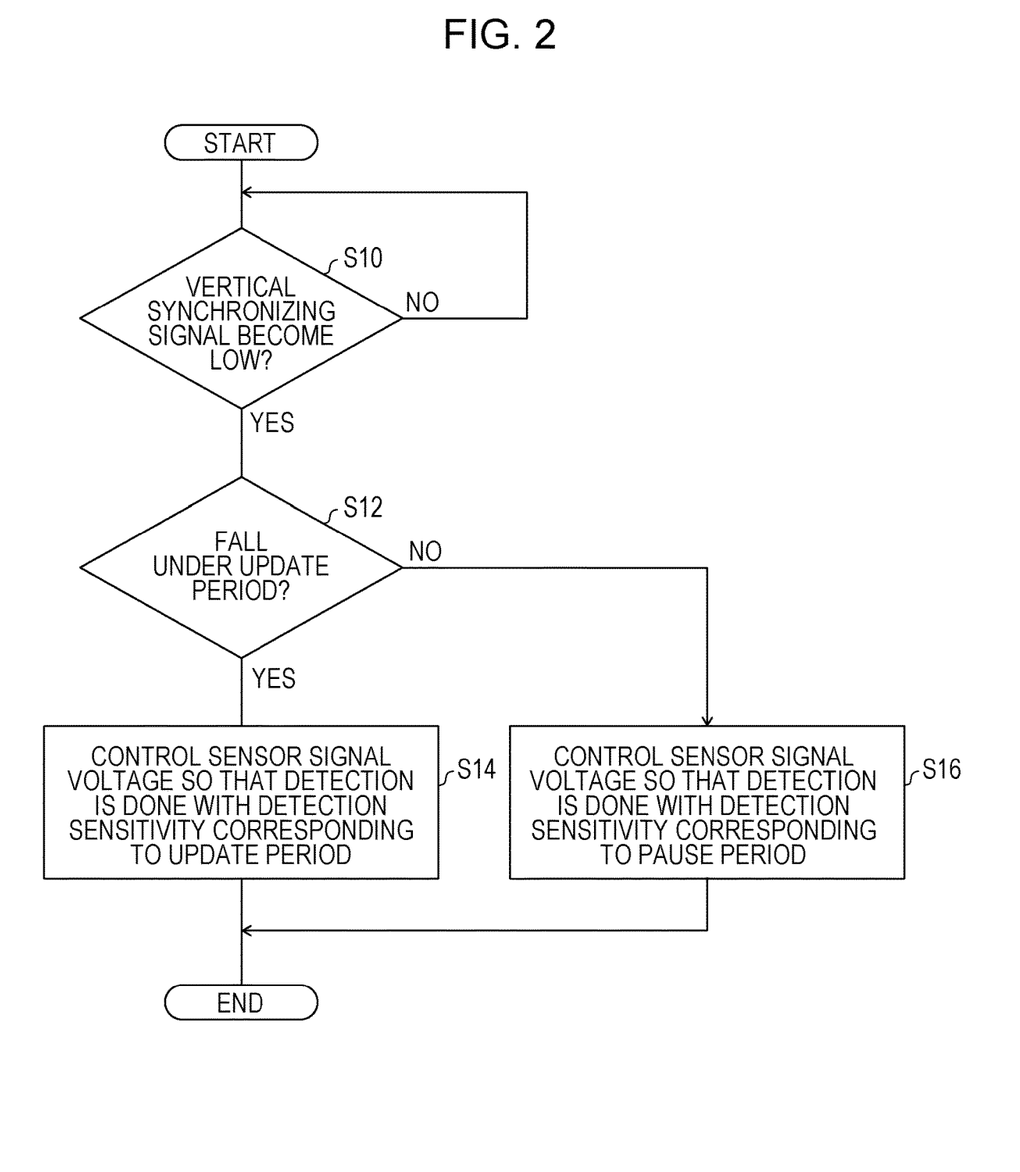
FIG. 2 is a flow chart explaining an example of an operation in a touch panel control device according to an embodiment of the present invention.

The following describes an operation of the touch panel control device 1 according to the present embodiment. FIG. 2 is a flow chart explaining an example of an operation of the touch panel control device 1 according to the present embodiment. The inputting of the vertical synchronizing signal is hereinafter referred to as "the vertical synchronizing signal becomes low".

As shown in FIG. 2, first, in step S10, the liquid crystal drive controller 10 monitors the vertical synchronizing signal and determines whether the vertical synchronizing signal inputted has become low. The liquid crystal drive controller 10 repeats the determination of step S10 until the vertical synchronizing signal becomes low (until the determination of step S10 becomes "YES"). In a case where the vertical synchronizing signal has become low (the determination of step S10 is "YES"), the liquid crystal drive controller 10 determines a new frame period has started, and processed to step S12.

In step S12, the normal/pause drive determination circuit 12 determines, with reference to image data inputted to the liquid crystal drive controller 10 which corresponds to a period in which the vertical synchronizing signal becomes low, whether the period in which the vertical synchronizing signal becomes low falls under an update period.

In a case where the normal/pause drive determination circuit 12 has determined that the period in which the vertical synchronizing signal becomes low falls under an update period, i.e. in a case where step S12 has been affirmed (the determination of step S12 is "YES"), the normal/pause drive determination circuit 12 generates a normal/pause drive determination signal indicating that it is an update period, and outputs the normal/pause drive determination signal to the sensor drive section 22. Then, the process of the touch panel control device 1 proceeds to step S14.

In step S14, the sensor drive section 22 outputs a senor signal voltage at which the touch sensor 30 can detect a touch with a detection sensitivity corresponding to the update period. Signals and the like that are sent out from the touch panel control device 1 for detection with the detection sensitivity corresponding to the update period will be described later with reference to an example of a timing chart shown in FIG. 3.

In a case where the normal/pause drive determination circuit 12 has determined that the period in which the vertical synchronizing signal becomes low does not fall under an update period, i.e. in a case where step S12 has been negated (the determination of step S12 is "NO"), the normal/pause drive determination circuit 12 generates a normal/pause drive determination signal indicating that it is a pause period, and outputs the normal/pause drive determination signal to the sensor drive section 22. Then, the process of the touch panel control device 1 proceeds to step S16.

In step S16, the sensor drive section 22 outputs a sensor signal voltage at which the touch sensor 30 can detect a touch or an approach with a detection sensitivity corresponding to the pause period. Signals and the like that are sent out from the touch panel control device 1 for detection with the detection sensitivity corresponding to the pause period will be described later with reference to an example of a timing chart shown in FIG. 3.

<Example of Timing Chart>

Figure 3:
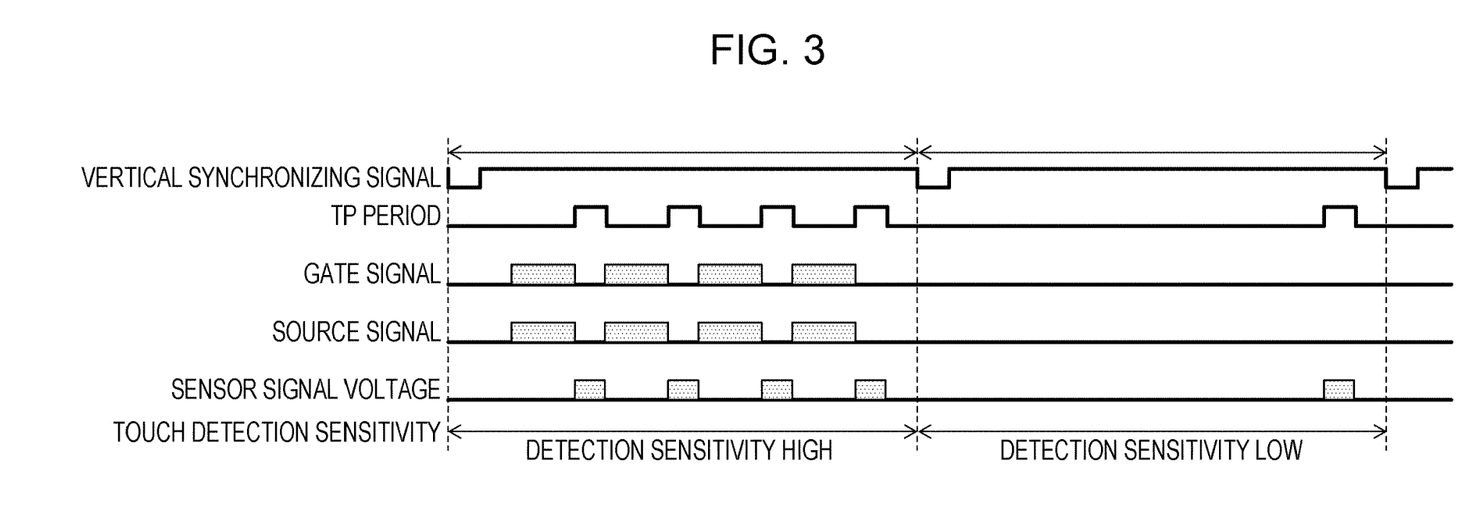
FIG. 3 is a timing chart showing signals and the like that are sent out from a touch panel control device according to Embodiment 1 of the present invention to a touch panel.

FIG. 3 is a timing chart showing a vertical synchronizing sig al of the liquid crystal display panel 40 according to Embodiment 1, a period (TP period) during which the touch sensor 30 can detect a touch, a sensor signal voltage that is outputted from the sensor drive section 22 in order for the touch sensor 30 to detect a touch, and gate and source signals by which the liquid crystal display panel 40 is driven.

In the present embodiment, the gate signal and the source signal are applied to the liquid crystal display panel 40 in an update period, and are not applied to the liquid crystal display panel 40 in a pause period. That is, FIG. 3 shows a case where the first frame is an update period and the second frame that follows the first frame is a pause period.

A touch on or an approach to the touch panel 2 can be detected during high portions of time of the TP period in FIG. 3. During the high portions of time of the TP period, the sensor signal voltage is outputted from the sensor drive section 22.

In the present embodiment, the pause period is shorter in detection period than the update period. FIG. 3 illustrates, as an example, a case where the detection period in the pause period is ¼ of the detection period in the update period. As shown in FIG. 3, since the amplitude of a sensor signal voltage that is outputted in the update period and the amplitude of a sensor signal voltage that is outputted in the pause period are equal, the detection sensitivity during the pause period is lower than the detection sensitivity during the update period. Moreover, the power consumption of the information processing apparatus 100 during the pause period is lower than that during the update period.

It should be noted that the proportion of the detection period in the pause period to the detection period in the update period is arbitrary, and the proportion illustrated in FIG. 3 is an example.

For convenience, FIG. 3 is illustrated such that the gate signal becomes high four times in one vertical period (i.e. one frame period). In actuality, however, the number of times that the gate signal becomes high in one vertical period corresponds to the number of scanning signal lines.

In the touch panel control device 1 according to the present embodiment, the sensor drive section 22 is controlled in accordance with a normal/pause drive determination signal that is outputted from the normal pause drive determination circuit 12. That is, when a signal representing a pause period is outputted to the sensor drive section 22, a sensor signal voltage controlled so that the detection sensitivity of the touch sensor 30 becomes low is outputted to the touch sensor 30.

In general, an information processing apparatus needs only be configured such that during a pause period, the touch sensor can detect whether a pointer is going to perform an operation on the touch panel. More specifically, an information processing apparatus detects the presence or absence of a touch in a pause period and shifts to an update period according to the detection (i.e. detects the presence or absence of a user's operation in a pause period and, in the presence of a user's operation, shifts to an update period in order to display an image corresponding to the user's operation). Therefore, the information processing apparatus has no problem in actual use even if the detection sensitivity is low during the pause period.

In this way, the touch panel control device 1 needs only be able to accurately recognize the position of a pointer on the detection surface of the touch panel 2 during an update period in which the display screen of the liquid crystal display panel 40 is updated; that is, the detection sensitivity needs only be high during the update period. That is, the control of the touch panel control device 1 according to the present embodiment makes it possible to reduce the power consumption of the touch panel control device 1 without causing a problem in actual use.

Further, in a case where the vertical synchronizing signal has a frequency of 60 Hz, the duration of one frame is ⅟60 second, i.e. approximately 17 ms. Therefore, in the case of a pause period of 17 ms, it is virtually unthinkable that a user brings a pointer into touch with the touch panel and moves the pointer away from the touch panel within the pause period. In view of such a situation, the touch panel control device 1 may be configured such that the pause period is a period during which the image that is displayed on the liquid crystal display panel 40 can be updated by the liquid crystal drive controller 10 a plurality of times continuously (e.g. a period of three frames or a period in which the horizontal synchronizing signal is inputted five times) and the sensor drive section 22 makes the number of times the touch sensor 30 detects a touch in the pause period smaller than the plurality of times (for example, in a case where the pause period is a period of three frames, the touch sensor 30 may detect a touch one time in the pause period). This configuration allows the touch panel control device 1 to more appropriately reduce the amount of electricity that it consumes.

Embodiment 2

Another embodiment of the present invention is described below with reference to FIG. 4. For convenience of explanation, members having the same functions as those described in the foregoing embodiment are given the same signs and, as such, are not described below. The present embodiment describes a configuration in which the touch panel control device 1 applies a sensor signal voltage of one amplitude to the touch sensor 30 in an "update period" and applies a sensor signal voltage of another amplitude to the touch sensor 30 in a "pause period".

Figure 4:
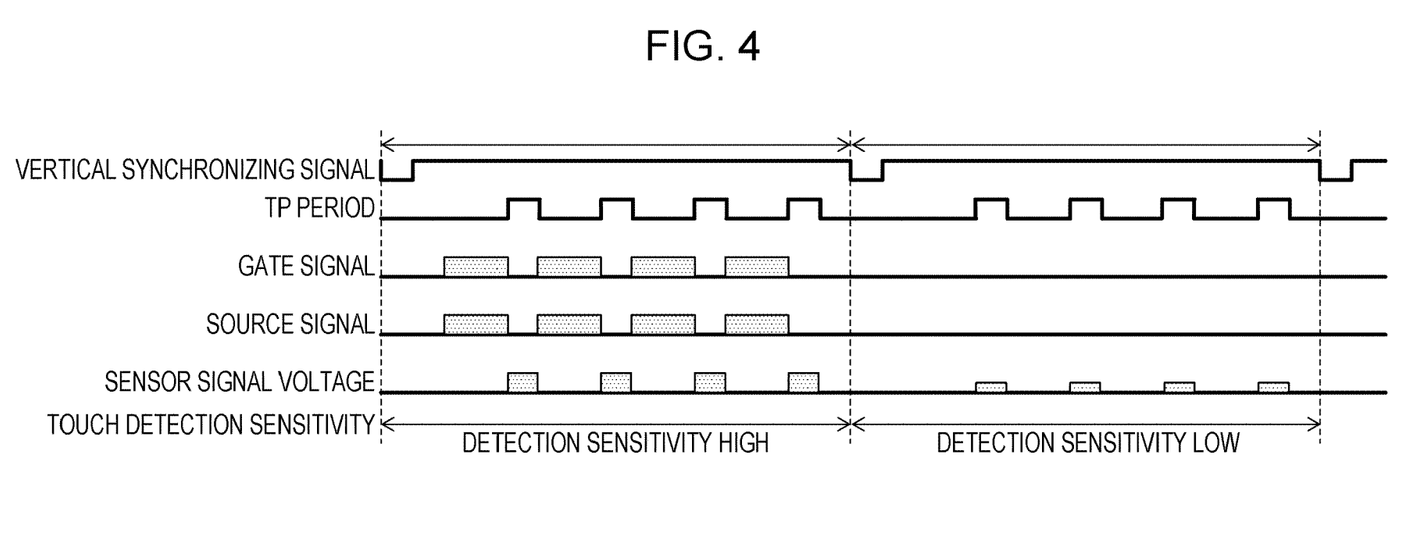
FIG. 4 is a timing chart showing signals and the like that are sent out from a touch panel control device according to Embodiment 2 of the present invention to a touch panel.

FIG. 4 is a timing chart showing a vertical synchronizing signal that is sent out from the touch panel control device 1 according to Embodiment 2, a TP period, a sensor signal voltage that is outputted from the sensor drive section 22 in order for the touch sensor 30 to detect a touch, and gate and source signals by which the liquid crystal display panel 40 is driven.

In the present embodiment, too, the gate signal and the source signal are applied to the liquid crystal display panel 40 in an update period, and are not applied to the liquid crystal display panel 40 in a pause period. That is, FIG. 4 shows a case where the first frame is an update period and the second frame that follows the first frame is a pause period.

A touch on the touch panel 2 can be detected during high portions of time of the TP period in FIG. 4. During the high portions of time of the TP period, the sensor signal voltage is outputted from the sensor drive section 22.

In the present embodiment, the pause period is smaller in amplitude of the sensor signal voltage than the update period. FIG. 4 illustrates, as an example, a case where the amplitude of the sensor signal voltage in the pause period is approximately ½ of that in the update period. As shown in FIG. 4, since the detection period in the pause period and the detection period in the update period are equal, the detection sensitivity during the pause period is lower than the detection sensitivity during the update period. Moreover, the power consumption of the information processing apparatus 100 during the pause period is lower than that during the update period.

It should be noted that the proportion of the amplitude of the sensor signal voltage in the pause period to the amplitude of the sensor signal voltage in the update period is arbitrary, and the proportion illustrated in FIG. 4 is an example.

Embodiment 3

Another embodiment of the present invention is described below. For convenience of explanation, members having the same functions as those described in the foregoing embodiment are given the same signs and, as such, are not described below.

In Embodiment 1, the detection sensitivity during the pause period is made lower than the detection sensitivity during the update period by applying the sensor signal voltage to the touch sensor 30 for a shorter period of time in the pause period than in the update period. Further, in Embodiment 2, the detection sensitivity during the pause period is made lower than the detection sensitivity during the update period by making the amplitude of the sensor signal voltage smaller in the pause period than in the update period.

In the present embodiment, the detection period in the pause period is made shorter than the detection period in the update period, and the amplitude of the sensor signal voltage in the pause period is made smaller than the amplitude of the sensor signal voltage in the update period. This makes it possible to make the detection sensitivity during the pause period lower than the detection sensitivity during the update period and thereby make the power consumption of the information processing apparatus 100 during the pause period lower than that during the update period.

In the present embodiment, the proportion of the detection period in the pause period to the detection period in the update period and the proportion of the amplitude of the sensor signal voltage in the pause period to the amplitude of the sensor signal voltage in the update period are arbitrary.

Example of Implementation by Software

Control blocks (in particular, the liquid crystal drive controller 10 and the touch sensor controller 20) of the touch panel control device 1 may be realized by a logic circuit (hardware) formed on an integrated circuit (IC chip) or the like or may be realized by software using a CPU (central processing unit).

In the latter case, the touch panel control device 1 includes a CPU that executes a command from a program serving as software that realizes each function, a ROM (read-only memory) or a storage device (both collectively referred to as "storage medium") on which the program and various types of data are computer- (or CPU-)readably stored, a RAM (random-access memory) in which the program is developed, and the like. Moreover, an object of an aspect of the present invention is attained by a computer (or a CPU) reading out the program from the storage medium and executing the program. A usable example of the storage medium is a "non-transient tangible medium" such as a tape, a disk, a card, a semiconductor memory, or a programmable logic circuit. Further, the program may be supplied to the computer via any transmission medium (such as a communication network or a broadcast wave) via which the program can be transmitted. It should be noted that an aspect of the present invention can also be realized in the form of a data signal, embedded in a carrier wave, in which the program is embodied by electronic transmission.

CONCLUSION

A touch panel control device 1 according to Aspect 1 of the present invention includes: a touch sensitivity changing section (sensor drive section 22) that changes a detection sensitivity with which a touch sensor 30 detects a touch; and a display control section (liquid crystal drive controller 10) that controls an image that is displayed on a display section (liquid crystal display panel 40). The touch sensitivity changing section (sensor drive section 22) makes a detection sensitivity during a pause period lower than a detection sensitivity during an update period, the pause period being a period in which the display control section (liquid crystal drive controller 10) does not update the image that is displayed on the display section (liquid crystal display panel 40), the update period being a period in which the display control section (liquid crystal drive controller 10) updates the image that is displayed on the display section (liquid crystal display panel 40).

According to the foregoing configuration, the touch panel control device 1 makes the detection sensitivity during the pause period, which is a period in which the image that is displayed is not updated, lower than the detection sensitivity during the update period, which is a period in which the image that is displayed is updated. This makes it possible to reduce the power consumption of the touch panel control device 1.

In Aspect 1, a touch panel control device 1 according to Aspect 2 of the present invention may be configured such that the touch sensitivity changing section (sensor drive section 22) attains a lower detection sensitivity by making the number of times the touch sensor 30 detects a touch in the pause period smaller than the number of times the touch sensor 30 detects a touch in the update period.

According to the foregoing configuration, the touch sensitivity changing section (sensor drive section 22) can control the detection sensitivity by changing the number of times the touch sensor 30 detects a touch. This allows the touch panel control device 1 to appropriately reduce the amount of electricity that it consumes.

In Aspect 2, a touch panel control device 1 according to Aspect 3 of the present invention may be configured such that a length of the pause period is a length of a period during which the image that is displayed on the display section (liquid crystal display panel 40) is able to be updated by the display control section (Liquid crystal drive controller 10) a plurality of times continuously and that the touch sensitivity changing section (sensor drive section 22) makes the number of times the touch sensor 30 detects a touch in the pause period smaller than the plurality of times.

According to the foregoing configuration, for example, in a case where three consecutive frames of pause period follow one after the other without any interruptions in a configuration of the touch panel control device 1 in which a determination is made every single frame as to whether to update or not to update the image and the number of times a touch is detected in one frame of pause period is 1, the number of times (one time) a touch is detected in one frame of pause period may be not three consecutive times but one time in the three frames of pause period. This allows the touch panel control device 1 to appropriately reduce the amount of electricity that it consumes.

In any one of Aspects 1 to 3, a touch panel control device 1 according to Aspect 4 of the present invention may be configured such that the touch sensitivity changing section (sensor drive section 22) attains a lower detection sensitivity by making an amplitude of a signal that is outputted in a case where the touch sensor 30 has detected a touch in the pause period smaller than an amplitude of a signal that is outputted in a case where the touch sensor 30 has detected a touch in the update period.

According to the foregoing configuration, the touch sensitivity changing section (sensor drive section 22) can control the detection sensitivity by changing the amplitude of a signal that it outputs. This allows the touch panel control device 1 to appropriately reduce the amount of electricity that it consumes.

An information processing apparatus 100 according to Aspect 5 of the present invention includes: the touch panel control device 1 according to any one of Aspects 1 to 4; the touch sensor 30; the display section (liquid crystal display panel 40); and a host 3 that transmits, to the touch panel control device 1, an image to be displayed on the display section (liquid crystal display panel 40).

The foregoing configuration brings about effects which are comparable to those brought about by the touch panel control device 1 according to Aspect 1.

The touch panel control device 1 according to each aspect of the present invention may be realized by a computer. In this case, a touch panel control program for the touch panel control device 1 that causes the touch panel control device 1 to be realized by a computer by causing the computer to operate as each section (software element) of the touch panel control device 1 and a computer-readable storage medium having the touch panel control program stored thereon too are encompassed in the scope of an aspect of the present invention.

An aspect of the present invention is not limited to any of the embodiments described above, but may be altered within the scope of the claims. An embodiment based on a proper combination of technical means disclosed in different embodiments is encompassed in the technical scope of as aspect of the present invention. Furthermore, a new technical feature can be formed by combining technical means disclosed in the embodiments.

REFERENCE SIGNS LIST

1 Touch panel control device
2 Touch panel
10 Liquid crystal drive controller (display control section)
22 Sensor drive section (touch sensitivity changing section)
30 Touch sensor
100 information processing apparatus

The invention claimed is:

1. A touch panel control device comprising:
a touch sensitivity changing section that changes a detection sensitivity with which a touch sensor detects a touch; and
a display control section that controls an image that is displayed on a display section,
wherein the touch sensitivity changing section makes a detection sensitivity during a pause period lower than a detection sensitivity during an update period, the pause period being a period in which the display control section does not update the image that is displayed on the display section, the update period being a period in which the display control section updates the image that is displayed on the display section.

2. The touch panel control device according to claim 1, wherein the touch sensitivity changing section attains a lower detection sensitivity by making the number of times the touch sensor detects a touch in the pause period smaller than the number of times the touch sensor detects a touch in the update period.

3. The touch panel control device according to claim 2, wherein a length of the pause period is a length of a period during which the image that is displayed on the display section is able to be updated by the display control section a plurality of times continuously, and
the touch sensitivity changing section makes the number of times the touch sensor detects a touch in the pause period smaller than the plurality of times.

4. The touch panel control device according to claim 1, wherein the touch sensitivity changing section attains a lower detection sensitivity by making an amplitude of a signal that is outputted in a case where the touch sensor has detected a touch in the pause period smaller than an amplitude of a signal that is outputted in a case where the touch sensor has detected a touch in the update period.

5. An information processing apparatus comprising:
the touch panel control device according to claim 1;
the touch sensor;
the display section; and
a host that transmits, to the touch panel control device, an image to be displayed on the display section.

* * * * *